(12) United States Patent
Chen et al.

(10) Patent No.: US 6,967,998 B1
(45) Date of Patent: Nov. 22, 2005

(54) METHOD AND APPARATUS FOR MONITORING TRANSMISSION QUALITY

(75) Inventors: Tao Chen, San Diego, CA (US); Fuyun Ling, San Diego, CA (US); Edward G. Tiedemann, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/438,988

(22) Filed: Nov. 12, 1999

(51) Int. Cl.[7] .............................................. H04L 1/20
(52) U.S. Cl. ...................................... 375/224; 375/346
(58) Field of Search ............................... 375/225, 224, 375/316, 346

(56) References Cited

U.S. PATENT DOCUMENTS

| | | | | |
|---|---|---|---|---|
| 5,570,411 A | * | 10/1996 | Sicher | 455/450 |
| 5,590,409 A | * | 12/1996 | Sawahashi et al. | 455/69 |
| 5,901,354 A | * | 5/1999 | Menich et al. | 455/442 |
| 5,909,434 A | * | 6/1999 | Odenwalder et al. | 370/342 |
| 6,163,571 A | * | 12/2000 | Asokan et al. | 375/225 |
| 6,169,731 B1 | * | 1/2001 | Stewart et al. | 370/332 |
| 6,304,563 B1 | * | 10/2001 | Blessent et al. | 370/335 |
| 6,493,329 B1 | * | 12/2002 | Leung | 370/335 |

FOREIGN PATENT DOCUMENTS

| | | |
|---|---|---|
| EP | 0696857 A1 | 2/1996 |
| EP | 1087730 A1 | 1/2001 |
| WO | 99/49610 | 9/1999 |

OTHER PUBLICATIONS

D. J. Gooding, "Performance Monitor Techniques for Digital Receivers, based on the Extrapolation of Error Rate", IEEE Transactions Com-16, pp. 380-387, Jun. 1968.*

* cited by examiner

*Primary Examiner*—Kevin Burd
(74) *Attorney, Agent, or Firm*—Philip R. Wadsworth; Thien T. Nguyen; George J. Oehling

(57) ABSTRACT

In wireless communications, it is necessary to monitor the transmission quality of communications channels to maintain system performance and operation. The invention provides a way of measuring bit error rates in channels at the receiver, without diminishing channel throughput by inserting quality monitoring data into the signal at the transmitter.

10 Claims, 5 Drawing Sheets

CHANNEL QUALITY MONITORING METHOD

WIRELESS COMMUNICATION CHANNEL 1.25 MILLISECOND POWER CONTROL GROUP

REVERSE LINK POWER CONTROL SUBCHANNEL STRUCTURE

CHANNEL QUALITY MONITORING APPARATUS

CHANNEL QUALITY MONITORING METHOD

METHOD AND APPARATUS FOR MONITORING TRANSMISSION QUALITY

BACKGROUND OF THE INVENTION

I. Field of the Invention

The current invention relates to wireless communications networks. More particularly, the present invention relates to a novel and improved method of monitoring the transmission quality of wireless communications channels.

II. Description of the Related Art

Monitoring the transmission quality of communication channels in wireless communications networks is necessary for system operation. System operation and performance cannot be maintained without accurate real time transmission quality feedback information.

Transmission quality is measured in terms of Bit Error Rate (BER). In telecommunication transmissions, the bit error rate is the percentage of bits that have errors relative to the total number of bits received in a transmission. The BER is usually expressed as a percentage. For example, a transmission might have a BER of 4%, meaning that, out of 100 bits transmitted, 4 bits were received in error.

Presently, there is no ideal method of monitoring transmission quality in wireless communications systems. Known methods of monitoring involve adding information to the transmitted signal solely for monitoring purposes. One such method of monitoring transmission quality is accomplished by inserting a known bit pattern into the transmitted signal, and comparing the received bit pattern with the actual pattern transmitted, to calculate the BER. Another current method adds Cyclic Redundancy Code (CRC) to the transmitted signal. Cyclic redundancy checking is a method of checking for errors in data that has been transmitted on a communications link. A sending device applies a 16-bit or 32-bit polynomial to a block of data that is to be transmitted and appends the resulting CRC to the block. The receiving end applies the same polynomial to the data and compares its result with the result appended by the sender. If the CRCs agree, the data has been received without error.

Any transmission quality monitoring method which adds known bit patterns or CRC bits to the transmitted signal reduces the traffic flow throughput of the channel. Additionally, CRCs only indicate the presence of block errors, not a true measure of the BER.

SUMMARY OF THE INVENTION

The present invention is a novel and improved method of monitoring wireless communication transmission channel quality without using a percentage of the channel throughput, energy, and time previously used for insertion of monitoring information. The method of the present invention improves channel throughput and provides a closer measure of actual BERs by reusing information already carried in the channel for other purposes. By taking advantage of known information, such as pilot symbols, to calculate BERs, the present invention can monitor transmission quality without utilizing channel bandwidth for this purpose.

To monitor the unknown quality of channels without actual error measures, the present invention forms proxy BERs from known channel information. The present invention generates proxy BERs by processing the known channel information in the same way the monitored channel is processed.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
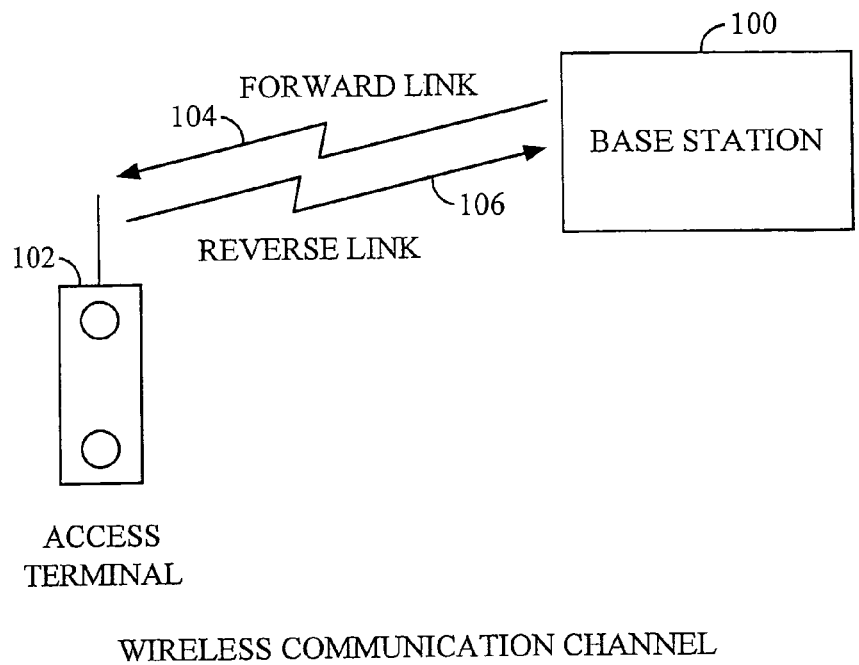
FIG. 1 is a high level diagram of a wireless communications channel.

FIG. 1 shows a high level diagram of a wireless communications link between Base Station 100 and Access Terminal 102. Access Terminals 102 are also known as mobile stations in wireless communications systems. Base Station 100 and Access Terminal 102 communicate over 2 links known as Forward Link 104 and Reverse Link 106. Information travels from Base Station 100 to Access Terminal 102 over Forward Link 104. Access Terminal 102 is the receiver in the Forward Link 104. Information travels from Access Terminal 102 to Base Station 100 over Reverse Link 106. Base Station 100 is the receiver in the Reverse Link 106.

In the IS2000 system, reverse Link 106 has 4 channels; the Reverse Fundamental Channel, the Reverse Dedicated Control Channel, the reverse pilot channel, and the Reverse Supplemental Channel. A reverse power control sub-channel is punctured into the reverse pilot channel, prior to Walsh channelization and PN spreading. Bits are punctured in with a value of +1 or −1. The power control sub-channel bits provide Access Terminal 102 with a mechanism of commanding Base Station 100 to go up or down in transmit power on the Forward Link 104, in order to achieve a specified received Frame Erasure Rate (FER) level for Access Terminal 102. Base Station 100 tells Access Terminal 102 what the desired FER is for the Forward Link 104, and then, Base Station 100 maintains that level through the power control commands, or feedback, it receives on the Reverse Link 106. Achieving the desired FER on the Forward Link 104 allows the wireless communications system to use as little of the base station power, and create as little network interference, as possible to maintain acceptable communications quality. Reduced use of base station power and interference with other Access Terminals increase system capacity.

Base Station 100 follows power control commands from Access Terminal 102 to increase power (+1), or decrease power (−1) on the Forward Link 104, depending on whether the BER received by Access Terminal 102 is above or below the desired rate set by Base Station 100. In an alternative embodiment, the power control command bits can be a multiple-bit command containing the amount of power adjustment requested.

The reverse power control sub-channel does not carry any error detection. It strictly carries information about the quality of the transmission on the Forward Link 104 in the form of power control commands, or feedback. The reverse power control sub-channel does not carry user traffic bits. Its purpose is for power control of Forward Link 104. The quality of the reverse power control sub-channel is unknown unless some monitoring is performed. The present invention monitors the quality of the reverse power control sub-channel without inserting monitoring information by using a proxy, or an extrapolated method, illustrated by the following figures.

Due to the nature of creating a proxy BER for unknown channel information from known channel information, one skilled in the art will understand that the method of monitoring quality used on the Reverse Link of the exemplary embodiment may be applied to any wireless communication channel.

Wireless communication channels are defined as specified in "Physical Layer Standard for cdma2000 Spread Spectrum Systems" incorporated by reference herein. The present invention provides a mechanism to test IS 2000 physical layer performance defined in "Physical Layer Standard for cdma2000 Spread Spectrum Systems". It will be understood that the present invention is equally applicable to other communications systems and that the present invention is not limited in scope to IS-2000 CDMA systems but can be applied to other wireless communications systems.

Figure 2:
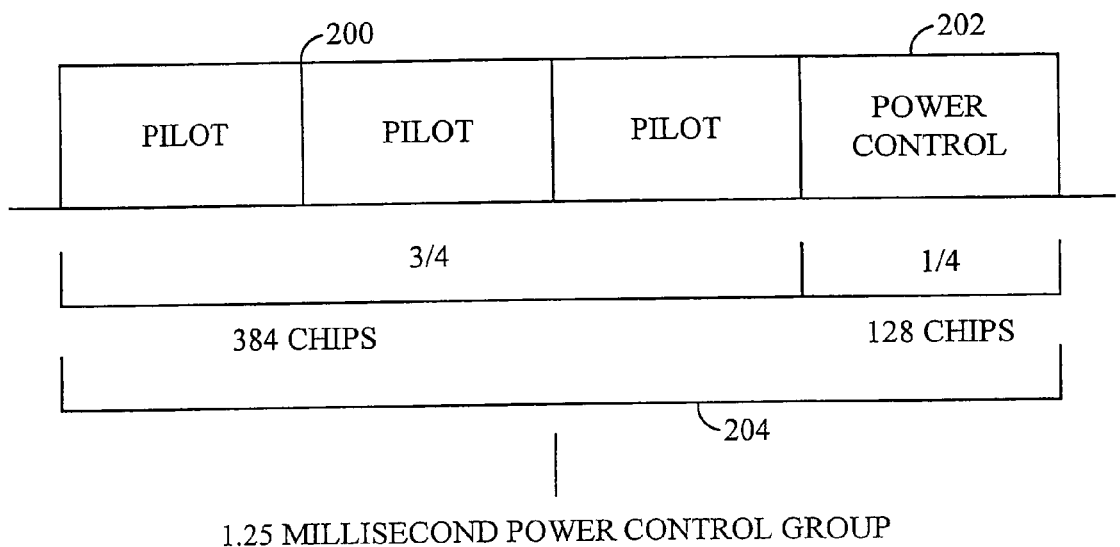
FIG. 2 is a diagram of the reverse link power control sub-channel structure.

FIG. 2 shows a diagram of the reverse link power control sub-channel structure of the exemplary embodiment. Each 1.25 milliseconds, a Power Control Group (PCG) 204 is transmitted on the reverse pilot channel. In every PCG 204, ¾ of the signal is reverse pilot channel 200 and ¼ of the signal is reverse power control sub-channel 202. The pilot channel 200 is a constant +1 value signal, carrying no information. The reverse power control sub-channel 202 is a repetition of the forward power control bit command, +1 or −1, generated by Access Terminal 102. In CDMA technology, time is often measured in units of chip. In spread rate 1 of the IS-2000 system, the CDMA chip rate is 1.2288M chips per second, 1 chip=1/(1.2288M chips per second)= 813.8 nanoseconds. A PCG 204 contains 384 Pilot Signal chips 200 and 128 Power Control chips 202.

In the exemplary embodiment, all chips sent on the reverse pilot channel within a PCG are transmitted at nominally the same power level, meaning the Pilot Signal chips 200 and Power Control chips 202 have the same amplitude with a total duration ratio of 3:1. It will be understood by one skilled in the art that the present invention can be extended to cases where other relationships between the pilot symbols and the power control bits exists. The present invention exploits these known channel characteristics. By monitoring the known pilot channel signal, the present invention generates a proxy BER which will be similar to the actual BER of the unknown information in the reverse power control sub-channel.

The present invention provides a way to monitor BER of channels that have some known characteristics, such as pilot symbols or pilot channels, without the use of CRC bits or any other insertion of known bit patterns into the bit stream itself. By looking at the side information produced from the known characteristics, such as the pilot channel, the BER can be determined indirectly for the unknown information, such as the reverse power control.

An example of other known information in CDMA communications channels are pilot symbols. Pilot symbols are treated the same as pilot channels.

Figure 3:
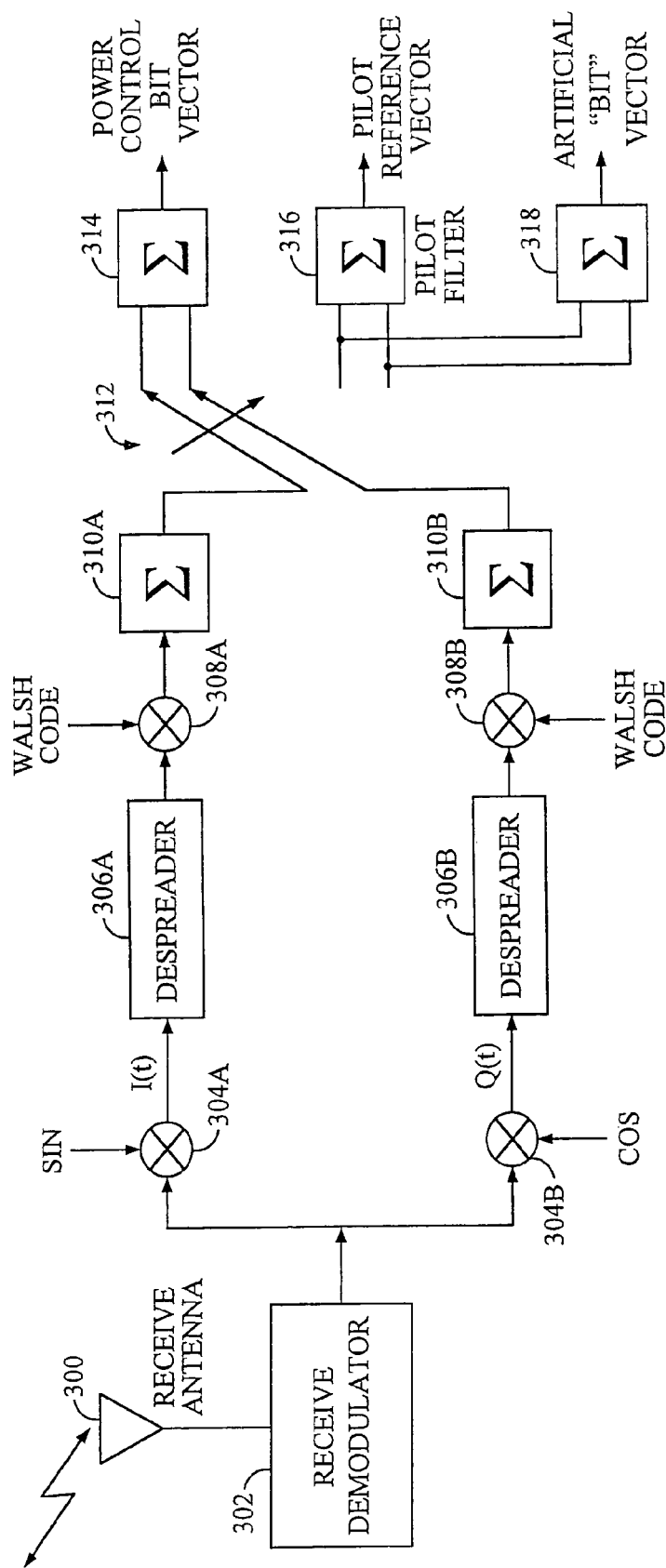
FIG. 3 is a diagram of apparatus employed by the method of the present invention to monitor channel quality.

FIG. 3 shows a diagram of an exemplary embodiment of the apparatus employed by the present invention to monitor channel quality, and test the performance of the physical layer of wireless communications systems. The apparatus shown separates the pilot channel and the power control channels from the combined received signal. The chips are separated so that they can be coherently summed, in order to generate artificial bit errors on the pilot channel to use as a proxy for the BER on the power control bits. FIG. 3 shows the path of the received signal only through the hardware used by the invention to monitor signal quality.

Antenna 300 is a transducer that converts RF (radio-frequency) fields into (alternating current) AC or vice-versa. A receive antenna intercepts RF energy and delivers AC to electronic equipment. The received analog signal reaches antenna element 300, and is downconverted to a baseband analog signal by the receive demodulator element 302.

After downconversion 302, the reverse power control sub-channel can be separated from the other channels in the signal.

The received signal is broken down into its In Phase (I) and Quadrature (Q) components by multiplier 304A and 304B respectively, producing a stream of complex numbers.

De-spreader elements 306 multiply out the pseudorandom (PN) sequences, or separate out the chips. PN sequences are pseudorandom numbers used in wireless communications to separate subscribers signals in the Base Station receivers. De-spreaders 306 produce the I and Q samples of the original signal with all of the channels in the original signal still combined.

The reverse pilot channel and reverse power control sub-channel are separated out from the original signal by multipliers 308 and summers 310. Multipliers 308 separate the individual channels from the combined signal by multiplying it with the Walsh code for the channel, also known as removing the Walsh cover. A Walsh code is an orthogonal sequence used in wireless communications to separate channels.

Summer elements 310 coherently combine, or add as complex numbers, the chips or samples of chips, of the separated channels over time.

The separated channel chip stream is switched 312 to a power control bit vector summer element 314 during the ¼ of the 1.25 millisecond PCG time period that the reverse power control sub-channel signal is present. The output of the power control bit vector summer element 314 is the received power control bit vector.

The separated channel chip stream is switched 312 to a pilot filter summer element 316 and an artificial bit vector summer element 318 during the ¾ of the 1.25 millisecond PCG time period that the reverse pilot channel signal is present. The output of the pilot filter summer element 316 is a sliding Window sum of pilot channel chips which produces the pilot filter reference vector. The artificial bit vector summer element 318 is novel to the present invention. The output of the artificial [control] bit vector summer element 318 is an extracted segment of the pilot filter reference vector that represents an artificial power control bit vector.

The present invention projects the power control bit vector onto the pilot filter reference vector to determine power control bit polarity. Similarly, the artificial power control bit vector is projected onto the pilot filter reference vector to create a proxy BER for the unknown power control bits.

The power control bits (+1/−1) are taken out of the waveform of the reverse power control sub-channel by summing all the chips within the duration of that Power Control Bit PCB coherently (adding vectors or complex number as a complex summation). The pilot channel signal is taken out of the waveform of the reverse power control sub-channel by coherently summing all the chips within a given duration of time selected to optimize the reference for different channel conditions such as fast and slow fading.

By using the vectors created in the coherent summation of the pilot channel chips, the present invention extrapolates an indirect measurement of the error rate on the power control channel which cannot be measured directly. The method of extrapolation is detailed in the following figures.

Figure 4:
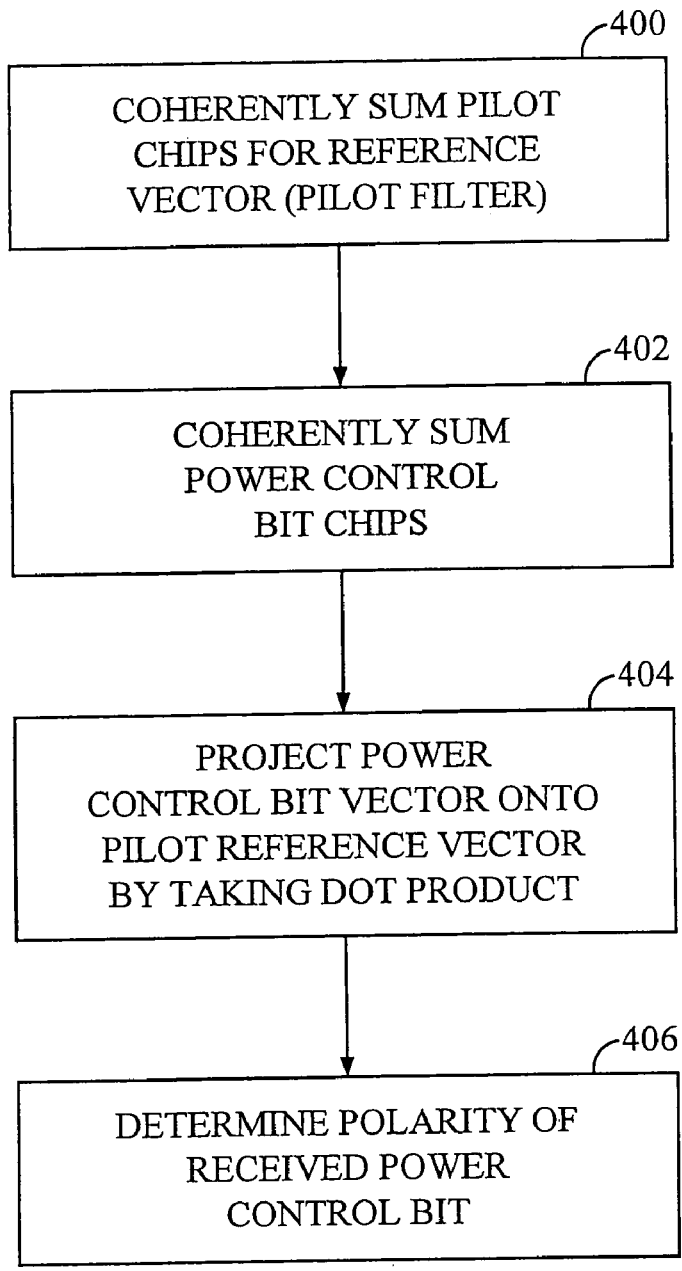
FIG. 4 is a high level flowchart diagram of the method of the present invention for determining power control bit polarity.

FIG. 4 is a high level flowchart diagram of the method of the present invention for determining power control bit polarity. The power control bits are valued at +1 or −1 when they are transmitted. The receiver must determine the polarity (+1 or −1) of the bits. Noise in the received signal may cause the receiver to flip the bit, or select the incorrect polarity of the received power control bit. Because the power control bits are transmitted without error detection information, the receiver cannot know their BER. In other words, the receiver cannot know the frequency with which it selects the incorrect polarity. The method of power control bit polarity determination is presented to illustrate the unknown information for which the present invention provides a proxy BER.

Bit polarity determination begins in block 400, by coherently summing the pilot channel chips to create a reference vector of +1 valued chips, the known value of the pilot signal. The vector is the sum of many pilot channel chips. The more pilot channel chips that are summed, the larger the pilot channel vector becomes, to the extent that the channel remains stationary. Random noise components of the samples cancel each other out, while the pilot vector gets larger in the same direction. A stable +1 valued reference vector with a high signal to noise ratio (S/N) is produced, against which the polarity of the power control bit can be judged by the receiver.

In block 402, all the power control chips of the PCG for the given power control bit are coherently summed to create a PCB vector.

In block 404, the inner product of the two vectors is taken. The inner product projects the power control bit vector on to the pilot channel reference vector. The inner product result yields a signed value indicating the polarity.

The polarity of the power control bit is determined in block 406 by examining the sign of the inner (or dot) product. If the sign is positive or the angle is less 90 degrees, the received power control bit is determined to be +1, or in alignment with the known +1 reference. If the sign is negative or the angle is more than 90 degrees, the received power control bit is determined to be −1, or against the alignment of the known +1 reference.

Figure 5:
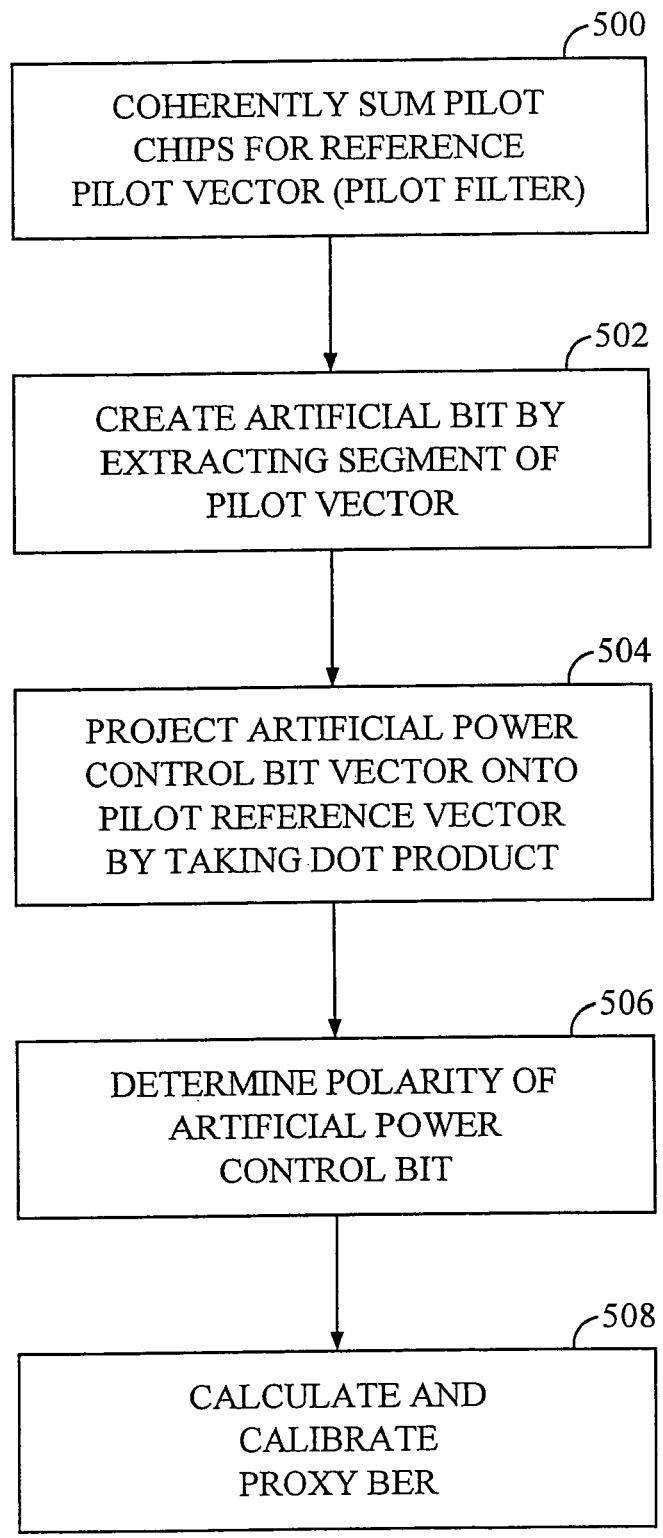
FIG. 5 is a high level flowchart diagram of the channel quality monitoring method of the present invention.

The BER, or frequency with which the process fails due to noise, cannot be known by the receiver without the quality monitoring method of the present invention FIG. 5 is a high level flowchart diagram of the channel quality monitoring method of the present invention.

In the exemplary embodiment of the present invention, artificial bit errors are generated on the pilot channel, and the BER of the artificial bits is used as a proxy BER for the power control sub-channel BER. The proxy BER can be used because the error rate of both channels is statistically the same.

In block 500, a pilot channel reference vector is created in the same manner used to determine power control bit polarity (block 400 of FIG. 4). The present invention uses the property that the pilot channel is always of the same polarity, it doesn't carry signal, and it is constant. Because it is constant, a segment (a duration of time) of the vector can be extracted to represent an artificial bit. One skilled in the art will understand that using the known property of a channel can be extended to any pilot channel or pilot symbol with a known pattern.

In block 502, chips are extracted from the pilot channel vector to form a segment of the vector. The chips of the extracted pilot channel vector segment are coherently added to form a complex number (vector) to represent the artificial power control bit, also known as a feedback bit. The segment is used as if it were the power control bit. Because the power control bit is transmitted in a similar way to the pilot on the reverse link, a segment of the pilot vector can be extracted and treated as a test signal (or artificial bit), to test whether the polarity is correct (+1) or incorrect (−1).

The signal in a small segment of PCG vector is transmitted in the same direction as the rest of the pilot vector. However, since it has finite duration there might be enough noise during that duration to flip it. A sum is taken over the segment to get a new vector, or artificial power control bit. This artificial bit can represent the power control bit even though the reverse pilot channel chips were not transmitted as such. A proxy BER for the power control bit can be created by determining the polarity of the artificial bits. Because it is known that when the polarity of the artificial bit is found to be −1, the result it is incorrect. The −1 polarity result has been defined as a bit error. It can be determined how often this incorrect result was calculated. This calculation is the measure of the bit error rate on the artificial bit, which is statistically equivalent to the actual BER of the power control bits. The BERs are statistically equivalent because the same noise statistic exists during the ¼ of the time the power control bit is present as during the ¾ of the time the pilot is present. The present invention uses this method of testing a known signal that has the same S/N ratio as an unknown signal to extrapolate a BER for the unknown information.

The artificially created power control bits of the present invention can be monitored in parallel with demodulating the power control bits on the reverse link to create a real time proxy BER.

The proxy BER of the present invention is used by the wireless communications system to maintain transmission quality, fix transmission quality at a specific level, ensure individual channels have individual quality levels, and test the physical layer of the system.

In block 504, the inner product of the pilot vector and the artificial bit vectors is taken. The inner product projects the artificial power control bit vector on to the pilot channel vector. The inner product result yields a signed result indicating the polarity.

The polarity of the artificial power control bit is determined in block 506 by examining the sign of the inner (or dot) product. If the sign is positive or the angle is less 90 degrees, the artificial power control bit is determined to be +1, or in alignment with the known +1 pilot signal. This result is correct by definition. If the sign is negative or the angle is more than 90 degrees, the artificial power control bit is determined to be −1, or against the alignment of the known +1 pilot vector. A −1 polarity of the artificial bit is incorrect by definition.

In block 508, the proxy BER of the power control sub-channel is calculated from the BER of the artificial bits, and calibrated for the channel characteristics of the pilot channel from which they were extracted.

The present invention calibrates the proxy BER to compensate for changing channel conditions by adjusting the length, or summation duration. If a channel is stationary, the signal vector stays in same direction. Coherent summing produces a longer vector in the same direction forever. This is a channel characterized by Average Guassian White Noise (AWGN). In an AWGN channel, the channel characteristics do not change over time. Actual noise seen from vector to vector is independent, and the S/N ratio is high. Summing more samples creates a more stable reference vector.

However, if the channel is time variant, or fades over time, the reference pilot vector changes by becoming longer and shorter at different angles. In this case, summing over too long a duration may result in the vectors canceling each other out.

In fading channels where a long summing duration does not produce a more stable reference, the present invention calibrates the summing duration of the pilot reference vector.

The present invention creates calibration tables by categorizing channel types in a test environment, and sending known information patterns to receivers in each category such as slow fading, fast fading, no fading (AWGN) etc., and comparing the proxy BER with the true BER, which can be determined from the known patterns available to the tester. The receiver classifies the channel environment by examining such information as variations in the pilot signal and the number of locked receiver fingers. The receiver uses the calibration table according to the channel classification. For example, a calibration table of the exemplary embodiment could be shown as:

| Proxy BER | $1 \times 10$ exp $-1$ | $1 \times 10$ exp $-1$ to $-3$ | $1 \times 10$ exp $-3$ to $-5$ |
|---|---|---|---|
| No fade | +0.001% | 0.002% | −0.001% |
| Slow Fade | +0.005% | +0.004% | +0.003% |
| Fast Fade | +0.007% | +0.008% | +0.009% |

The receiver may use the table for fine channel classifications and corrections, or it may make more general classifications and use averages of correction values. In cases where the channel types cannot be categorized, the present invention uses calibration table averages to correct for varying channel conditions. The corrections are then put back into the proxy BER calculations.

Channel S/N ratios differ on the Forward Link 104 from the Reverse Link 106. The BER extrapolation method of the present invention can be applied to Forward link channels as well as Reverse Link Channels by adding the extra step of adjusting for the unknown power ratios on the Forward Link channels.

On the Forward Link, the power control bits are not punctured into the Forward Link power control sub-channel at the same power level as the pilot. The Forward Link pilot power level is much stronger than the power control bits. The ratio of the power between power control bits and the forward pilot channel in unknown by the receiver. The forward pilot channel power is usually at a fixed percentage of the cell power (approximately 20%). The forward power control sub-channel power level is also tied to the forward fundamental, or host channel. The present invention selects shorter summing durations for the pilot reference window on the Forward Link which produce the same level of energy as the power control bits when creating vectors for proxy BERs on the Forward Link.

To extract the right amount of chips from the pilot reference to make the energy the same on both channel samples, the present invention uses methods of looking at the received S/N ratio of pilot channel and power control channel samples, measuring the amplitude difference between channel samples and determining S/N ratios by computation. Relatively accurate calibration corrections can be generated from these computations. The present invention also uses information about S/N ratios contained in messages from the Base station to calibrate BERs on the Forward Link.

Figure 6:
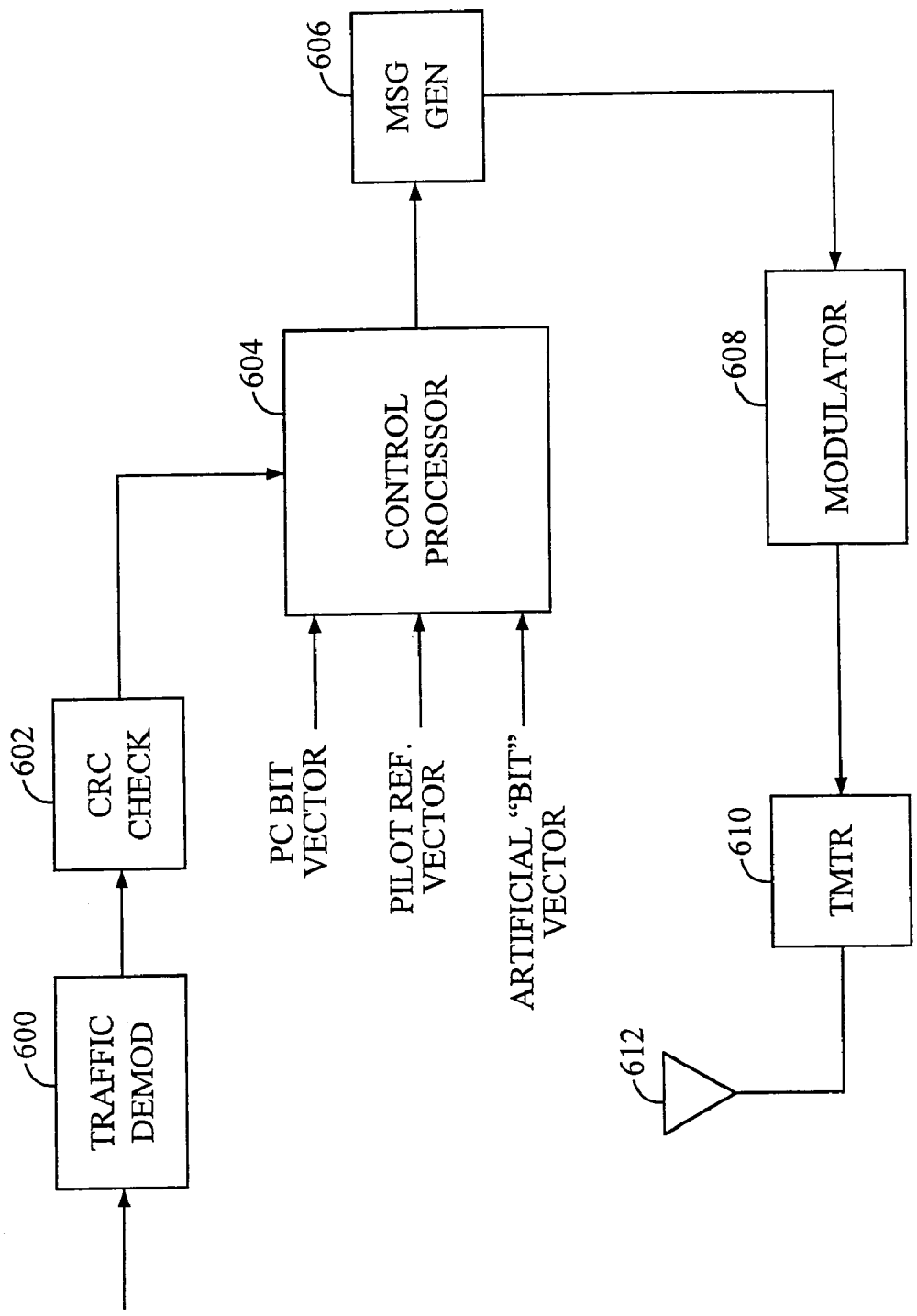
FIG. 6 is a block diagram of apparatus employed by the present invention to control the error rate of the power control subchannel while maintaining the error rate of the traffic channel at a different rate.

FIG. 6 illustrates, the apparatus for controlling the error rate of the power control subchannel while maintaining the error rate of the traffic channel at a different rate. The PN despread data is provided to traffic demodulator 600, which demodulates the despread data in accordance with a predetermined traffic Walsh sequence (Wt). In the exemplary embodiment, the demodulated symbols are provided to a cyclic redundancy check (CRC) element 602 which determines whether the demodulated symbols were correctly received. The result of the CRC check is provided to control processor 604.

In addition, the power control bit vector, the pilot reference vector and the artificial bit vector are provided to control processor 604. Control processor 604 computes the bit error rate of the power control subchannel as described above. Control processor 604 computes error rates for both the traffic channel and the power control subchannel.

In the exemplary embodiment, base station 100 transmits a message requesting access terminal 102 to increase or decrease the transmission energy difference between the transmission energy of the pilot channel and the traffic channel. This operation can alternatively be performed by independently controlling the transmission energies of the pilot channel and the traffic channel.

In the exemplary embodiment, message generator 606 generates a general up/down command to control the transmission energy of access terminal 102 in general and in addition generates a message indicative of changes to the energy relationship between the transmission energy of the pilot channel and the traffic channel.

The messages are provided to modulator 608 and are modulated for transmission. The modulated symbols are provided to transmitter 610 which up converts amplifies and filters the symbols for transmission through antenna 612.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for monitoring the quality of information received on a wireless communications channel, comprising:

creating a pilot channel reference vector by coherently summing pilot channel chips;

creating an artificial bit by extracting a segment of the pilot channel reference vector;

projecting the artificial bit onto the pilot channel reference vector;

determining a polarity of the artificial bit;

calculating a proxy bit error rate from a bit error rate of the artificial bit; and using the proxy bit error rate for monitoring a quality of the received information.

2. The method of claim 1, wherein said proxy bit error rate is used for physical layer testing purposes.

3. The method of claim 1, wherein said proxy bit error rate is used for maintaining transmission quality.

4. The method of claim 1, wherein said proxy bit error rate is used for fixing transmission quality at a specific level.

5. The method of claim 1, wherein said proxy bit error rate is used for providing individual channel transmission quality levels.

6. An apparatus for monitoring the quality of information received on a wireless communications channel, comprising:

means for creating a pilot channel reference vector by coherently summing pilot channel chips;

means for creating an artificial bit by extracting a segment of the pilot channel reference vector;

means for projecting the artificial bit onto the pilot channel reference vector;

means for determining a polarity of the artificial bit;

means for calculating a proxy bit error rate from a bit error rate of the artificial bit; and means for using the proxy bit error rate for monitoring a quality of the received information.

7. The apparatus of claim 6, wherein said proxy bit error rate is used for physical layer testing purposes.

8. The apparatus of claim 6, wherein said proxy bit error rate is used for maintaining transmission quality.

9. The apparatus of claim 6, wherein said proxy bit error rate is used for fixing transmission quality at a specific level.

10. The apparatus of claim 6, wherein said proxy bit error rate is used for providing individual channel transmission quality levels.

* * * * *